US005160840A

United States Patent [19]
Vestal

[11] Patent Number: 5,160,840
[45] Date of Patent: Nov. 3, 1992

[54] TIME-OF-FLIGHT ANALYZER AND METHOD

[76] Inventor: Marvin L. Vestal, 7851 Chinon Cir., Houston, Tex. 77011

[21] Appl. No.: 782,112

[22] Filed: Oct. 25, 1991

[51] Int. Cl.[5] ........................ B01D 59/44; H01J 49/00
[52] U.S. Cl. ........................................ 250/287; 250/282
[58] Field of Search ................ 250/281, 282, 286, 287

[56] References Cited

U.S. PATENT DOCUMENTS

| | | | |
|---|---|---|---|
| 3,727,047 | 4/1973 | James | 250/287 |
| 4,731,532 | 3/1988 | Frey et al. | 250/286 |
| 4,733,073 | 3/1988 | Becker et al. | 250/287 |
| 4,778,993 | 10/1988 | Waugh | 250/287 |
| 4,883,958 | 5/1989 | Vestal | 250/288 |
| 5,032,722 | 7/1991 | Boesl et al. | 250/286 |
| 5,045,694 | 9/1991 | Beavis et al. | 250/287 |

OTHER PUBLICATIONS

Article, "A Secondary Ion Time-of-Flight Mass Spectrometer With an Ion Mirror", International Journal of Mass Spectrometry and Ion Processes, 85 (1988) 43-67.
Article, "The Mass-Reflection, a New Nonmagnetic Time-of-Flight Mass Spectrometer with High Resolution", Sov. Phys. JETP, vol. 37, No. 1, 1973, pp. 44-48.
Article, "Time of Flight Mass Spectrometry with Various Desorption Probes", Y Le Beyec, pp. 126-145.
Article, "Mestastable Decay of Peptides and Proteins in Matrix-Assisted Laser-Desorption Mass Spectrometry", Rapid Communications in Mass Spectrometry, vol. 5, 198-202 (1991).
Article, "The Review of Scientific Instruments", Retarding Field Energy Analyzers, vol. 32, No. 12, Dec. 1961, pp. 1283-1293.
Article, "Time-of-Flight Mass Spectrometry for Ions of Large Energy Spread", W. Gohl et al., 1983 Elsevier Scientific Publishing Company.

*Primary Examiner*—Bruce C. Anderson
*Attorney, Agent, or Firm*—Browning, Bushman, Anderson & Brookhart

[57] ABSTRACT

A time-of-flight mass spectrometry and method of operating a TOF mass spectrometer are disclosed. The mass spectrometer includes one or more electrically charged accelerating plates for accelerating ions, a reflector, a first ion drift region upstream from the reflector, a second ion drift region downstream from the deflector, and an ion detector. The ion reflector includes a primary reflecting field for decelerating ions and reflecting low energy ions, and a second reflecting field for reflecting high energy ions and for establishing a substantially uniform ion flight time through the one or more accelerating fields and reflecting fields. According to the method of the present invention, the length of the ion drift regions may be adjusted such that ion travel time through these regions is equal to the ion travel time through the accelerating and reflecting fields. The second reflecting field downstream from the primary electrical field is adjusted such that high energy ions spend additional time in the second reflecting field compared to low energy ions to compensate for the shorter time high energy ions spend in the accelerating field and drift-free regions. The concepts of the present invention may be used with various techniques for producing ions, and ions may be formed in pulses by selectively activating a laser source, or formed in an ion beam pulsed toward the reflector by selectively activating the one or more of the accelerated fields.

20 Claims, 6 Drawing Sheets

TIME-OF-FLIGHT ANALYZER AND METHOD

BACKGROUND OF THE INVENTION

1. Field of the Invention

The present invention relates to mass spectrometers, and in particular relates to a time-of-flight mass analyzer with a reflector having improved performance and to a method of operating a mass spectrometer.

2. Description of the Background

Mass spectrometry (MS) has long been used to provide both quantitative and qualitative data not easily available from other analytical techniques. The broad scope of MS technology has been used to provide molecular weight, empirical formula, isotope ratios, identification of functional groups, and elucidation of structure. A great deal of research has been expended in further developing mass spectrometry technology, and improvements in this technology offer realistic expectations of substantially increased use of this analytical procedure.

Since at least the mid 1970's, it has been known to use a mass reflectron in conjunction with mass spectrometry in order to improve performance. A mass reflectron for a time-of-flight mass spectrometer is disclosed in an article entitled "The Mass Reflectron, A New Nonmagnetic Time-of-Flight Mass Spectrometer with High Resolution" by Mamyrin et al. A mass spectrometer with an improved reflectron is discussed in an article by Gohl et al entitled "Time-of-Flight Mass Spectrometry for Ions of Large Energy Spread", with this latter reflectron utilizing a "two-stage mirror" to minimize ion flight time variations. A recent article entitled "A Secondary Ion Time-of-Flight Mass Spectrometer With an Ion Mirror" by Tang et al illustrated that the two-stage mirror concept does not provide substantially improved results over a single-stage mirror. Accordingly, much of the effort to improving mass spectrometry techniques has been directed away from improvements to the reflectron.

U.S. Pat. No. 4,778,993 is directed to time-of-flight (TOF) mass spectrometer which substantially eliminates interference with the analysis by ions of mass greater than the highest mass of interest. U.S. Pat. No. 4,883,958 discloses an interface for coupling liquid chromatography to solid or gas phase detectors. An improved technique for TOF mass analysis involving laser desorption is disclosed in U.S. Pat. No. 5,045,694. Matrix-assisted laser desorption mass spectrometry and a two-stage reflectron were discussed in an article in *Rapid Communication in Mass Spectrometry*, Vol. 5, pp 198–202 (1991). Additional background information regarding time-of-flight mass spectrometry is in a keynote lecture by LeBeyec published in *Advances in Mass Spectrometry*, Vol. II A, pp 126–145.

Further improvements in the performance of time-of-flight mass spectrometers are required for this analytical procedure to gain greater acceptance and become a standard analytical tool for increased uses. The disadvantages of the prior art are overcome by the present invention, and an improved time-of-flight mass analyzer and method are hereinafter disclosed for improving mass spectrometry performance. The present invention has a wide range of applications, and may be used with various methods of generating ions of interest.

SUMMARY OF THE INVENTION

A continuing problem with the application of the existing time-of-flight mass spectrometry is that ions are frequently produced over a rather broad energy distribution range, thereby adversely affecting mass resolution. When matrix-assisted laser desorption is employed to produce ions, the ions are typically carried along in a plume of rapidly expanding matrix vapor which produces some ions at an energy level in excess of that acquired from the accelerating field. Moreover, ions accelerated by the electrical field may undergo collisions with gas phase molecules, thereby transferring a portion of their energy or their charge to the molecules. Also, some ions may spontaneously dissociate, thereby losing some of their mass and energy. Accordingly, some ions may have less energy than those which traverse the accelerating field without undergoing collisions, and accordingly spend a longer time in the accelerating field and drift regions of the time-of-flight mass spectrometer. Other ions may have larger kinetic energies, and accordingly spend a shorter time in traversing the accelerating field and drift regions to reach the detector. In other applications of time-of-flight mass spectrometry, ions may be formed with very little initial kinetic energy, but unlike laser desorption in which the ions are formed at or very near a surface with a well-defined electrical potential, the ions may be formed throughout a region. An electrical field is applied to accelerate the ions and, as a consequence of their differing initial positions in this field, the ions acquire differing amounts of kinetic energy.

The present invention recognizes the significant effect that the ion energy distribution has on the performance of a time-of-flight mass analyzer, and further recognizes that such energy distributions may have several causes. For example, in matrix-assisted laser desorption, some of the ions may be produced with excess initial kinetic energy as the result of acceleration by the plume of expanding matrix vapor, while other ions may lose energy as the result of collisions with molecules in the plume and be delayed in exiting the plume as the result of such collisions. Still other ions may dissociate in flight, thereby losing that portion of their energy (and mass) carried by the neutral fragment. The present invention provides a new time-of-flight mass analyzer which allows all of these effects, which otherwise limit the mass resolution, to be simultaneously corrected while maintaining efficient ion transmission from the source to the detector.

An improved time-of-flight mass spectrometer according to the present invention includes a conventional sealed housing and vacuum pump for maintaining a vacuum within the housing. An ion source is provided for producing pulses of ions through a primary accelerating field. An ion reflection device is provided downstream of a first ion drift region and upstream of a second ion drift region, and an ion detector downstream from the second ion drift region detects ions as a function of time. Additional elements involving acceleration and deceleration of ions may optionally be installed within either the first or second drift regions to focus the ions or to remove unwanted low energy ions. The ion reflection device preferably includes a first plurality of spaced reflecting plates for establishing a first ion mirror to reflect ions with energy less than that acquired by acceleration of ions in the primary accelerating field, a second reflecting plate or plates for establishing a second reflecting field, and means for adjusting the second reflecting field independent of the first field so that the total flight time of ions produced with excess kinetic energy is substantially the same as those produced with no excess kinetic energy. The first ion mirror of the present invention may be either a single-stage or a two-stage reflection mirror, each of which by itself is known in the prior art.

The present invention may optionally include additional elements to improve the overall performance of the time-of-flight mass spectrometer without degrading the desired compensation for energy distributions of the ion beam. For example, a deaccelerating/accelerating energy filter may be positioned between the second drift region and the detector. A potential equal to that applied to produce the primary accelerating field may be applied to the central element of this energy filter. In this manner, ions with an energy significantly less than that imparted by the primary accelerating field are prevented from reaching the detector. Accordingly, ions which have undergone dissociation after acceleration, or ions which have undergone collisions in the ion source which reduced their energy and delayed their extraction from the source, do not reach the detector and hence do not contribute to loss of mass resolution by the instrument. In the present invention, this removal of undesirable ions is accomplished while at the same time making the flight time of transmitted ions nearly independent of their excess kinetic energy. Similarly, focusing elements such as beam guides may be provided in the first and second ion drift regions to increase the ion transmission through these regions without materially reducing the overall mass resolution of the time-of-flight mass spectrometer. An adjustment means external to the housing is provided for selectively adjusting the spacing between the ion reflecting device and the ion source and/or detector.

The improved time-of-flight mass analyzer is based on the observation that ions with excess kinetic energy spend a shorter time traversing a field free region or an accelerating (or deaccelerating) field than do ions without excess energy, but a longer time in an ion mirror. The prior art employed ion mirrors or reflectrons to compensate for time spread in traversing a field free region, but did not provide apparatus or methods for compensating for the time spread in traversing accelerating and/or deaccelerating fields. The present invention preferably employs two additional elements to provide precise compensation for the variation in travel times through accelerating and deaccelerating fields. These additional elements include apparatus for forming an additional independently adjustable reflecting field downstream of the reflecting fields used in the prior art, and an adjustment means external to the housing of the analyzer for selectively adjusting the spacing between the ion reflecting device and the ion source and/or detector.

According to the method of the present invention, a first electrical reflector is established for decelerating and reflecting pulses of ions without excess kinetic energy, a second electrical field is established downstream of the first electrical reflector. The second electrical field is adjusted separately from the field or fields of the first electrical reflector to reflect ions with excess kinetic energy. Both the spacing between the reflection device and the ion source along with the electrical fields in the first and second ion reflectors are adjusted for obtaining a substantially uniform flight time from the ion source to the detector irrespective of the excess kinetic energy which the ions may possess.

It is an object of the present invention to provide an improved time-of-flight mass spectrometer with high performance.

Still another object of the invention is to provide an improved reflector for a time-of-flight mass spectrometer.

It is a further object of the invention to provide an improved mass spectrometer reflector for correcting the time differences that ions with differing kinetic energies spend in an accelerating or decelerating field, and thereby improve mass analyzer performance.

It is a feature of the present invention that an additional stage is added to an ion reflector to correct for varying ion flight time through accelerating fields.

Another feature of the present invention is the provision of means for adjusting the distance from the ion source or from the detector to the reflector to compensate for variations in ion flight time through non-uniform accelerating fields which may be employed to focus ions.

It is yet a further feature of the present invention to provide a technique whereby ions with an excess kinetic energy take an extra amount of time in the reflecting field which compensates for the shorter time they spend in the drift space and in accelerating and/or decelerating fields.

It is an advantage of the present invention that comparatively simple yet reliable techniques are provided for significantly increasing the resolution of time-of-flight mass spectrometry technology.

Another advantage of the present invention is that an ion reflector for a time-of-flight mass analyzer may be provided which corrects for ion flight time variations induced in the source region of the mass spectrometer.

It is a further advantage of the present invention that an ion reflector for a time-of-flight mass analyzer may be provided which corrects for ion flight time variations induced in a filter lens used for suppressing ion products resulting from dissociation of ions.

Yet a further advantage of the present invention is that an ion reflector for a time-of-flight mass analyzer is provided which corrects for ion flight time variations induced by focusing means used for increasing the transmission efficiency of ions.

These and further objects, features and advantages of the present invention will become apparent from the following detailed description, wherein reference is made to figures in the accompanying drawings.

DETAILED DESCRIPTION OF PREFERRED EMBODIMENTS

Figure 1:
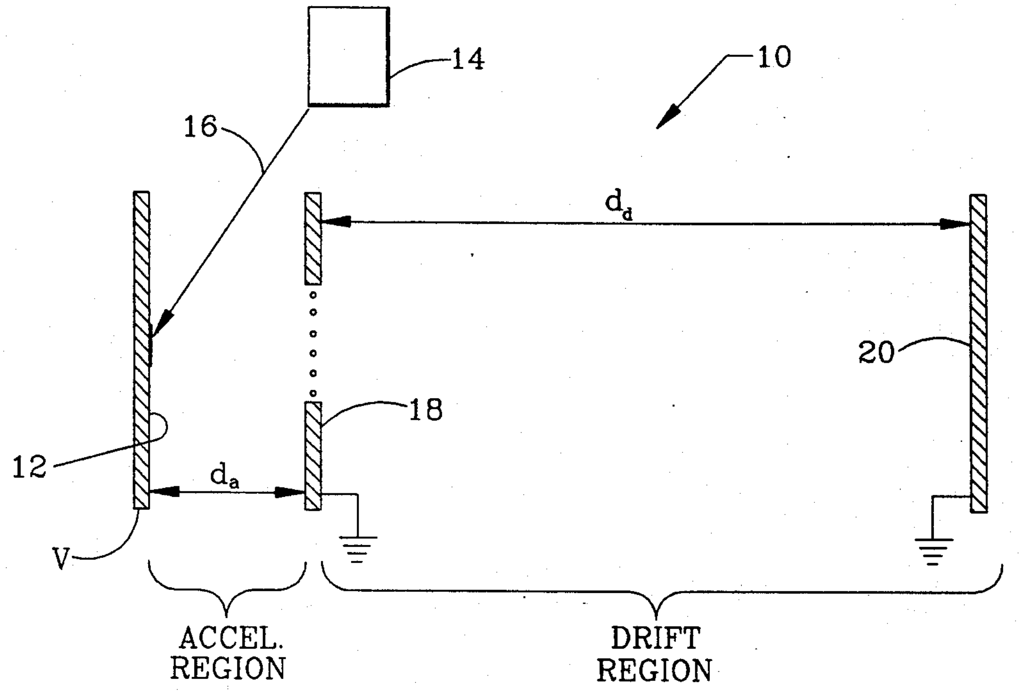
FIG. 1 PRIOR ART
FIG. 1 is a schematic diagram of a simple linear time-of-flight mass analyzer.

A simple time-of-flight mass spectrometer 10 is schematically depicted in FIG. 1. Ions are emitted from planar surface 12 charged to potential V, for example, as the result of energy imparted from source 14 in the form of an incident pulsed laser beam 16 which strikes a sample on surface 12. The ions are accelerated by a uniform electrical field created between plate 12 and by plate 18 at ground potential, then drift through a field-free region, and are detected by a planar detector 20. The total ion flight time t in the analyzer depicted in FIG. 1 is given by $$t=t_o+t_d \qquad \text{Eq. 1}$$

where $t_o$ is the time spent in the ion accelerating field, and $t_d$ is the travel time in the field-free drift space.

The time ions spend in the uniform accelerating field created by electrical potential V is given by $$t_o=(d_o/V)(2m/z)^{\frac{1}{2}}[(V+V_o)^{\frac{1}{2}}-V_o^{\frac{1}{2}}] \qquad \text{Eg. 2}$$

where $d_o$ is the distance between the surface 12 from which the ions are emitted and the exit from the accelerating field, m is the mass of the ion (kg), z is the charge (coul.), and $V_o$ is kinetic energy (eV) corresponding to the component of the initial velocity of the ion perpendicular to the surface and parallel to the accelerating field. Eq. 2 expresses in energy terms the fact that the time t is equal to the distance divided by the average velocity with which the ion travels that distance. The equations which follow are similar.

The ion flight time through the field-free drift space is given by $$t_d=(d_d/2)(2m/z)^{\frac{1}{2}}(V+V_o)^{-\frac{1}{2}} \qquad \text{Eq. 3}$$

where $d_d$ is the total length of the field-free drift space.

In the ideal time-of-flight mass spectrometer, the flight time should depend only on the mass-to-charge ratio, m/z, the accelerating potential, V, and the distance. Eq. 3 illustrates that the flight time also depends strongly on the initial kinetic energy of the ions, $V_o$ and, since the laser desorption process produces ions with a relatively broad range of kinetic energies, the resulting mass peaks are broadened and the ability to separate ions of different masses is diminished. The relative spread in ion travel times is given by $$dt/t=(\tfrac{1}{2})(V_o/V)-2(d_o/d_d)(V_o/V)^{\frac{1}{2}} \qquad \text{Eq. 4}$$

and the mass resolving power is given by $$m/dm=t/2dt \qquad \text{Eq. 5}$$

Prior art TOF analyzer designs have tried to compensate for the loss of mass resolution caused as the result of a velocity spread of ions of in the field-free drift region, but have ignored the effects in the ion source and accelerating field. Stated differently, these previous approaches have corrected contributions to time spread due to the first term of Eq. 4 but apparently assumed that the second term of Eq. 4 result in an insignificant error, or an error which could not practically be corrected. The mass reflectron which addressed the first term error was developed by Mamyrin and co-workers in the USSR, and has been further developed and refined by Wollnik and his associates in Germany, and by Standing in Canada. The original work by Mamyrin used a two stage mirror to correct the variation in flight time to second order, but Standing has shown that comparable results can be obtained using a single-stage mirror.

Figure 2:
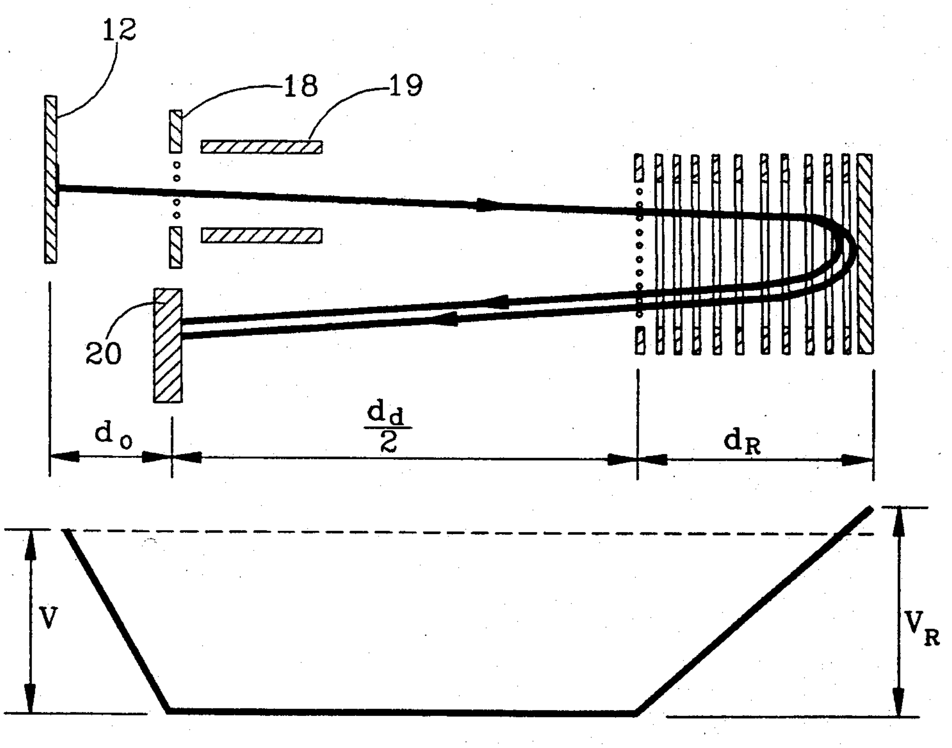
FIG. 2 PRIOR ART
FIG. 2 shows a simplified schematic diagram with potential distributions for a time-of-flight analyzer employing a single-stage reflectron according to the prior art.
Figure 3:
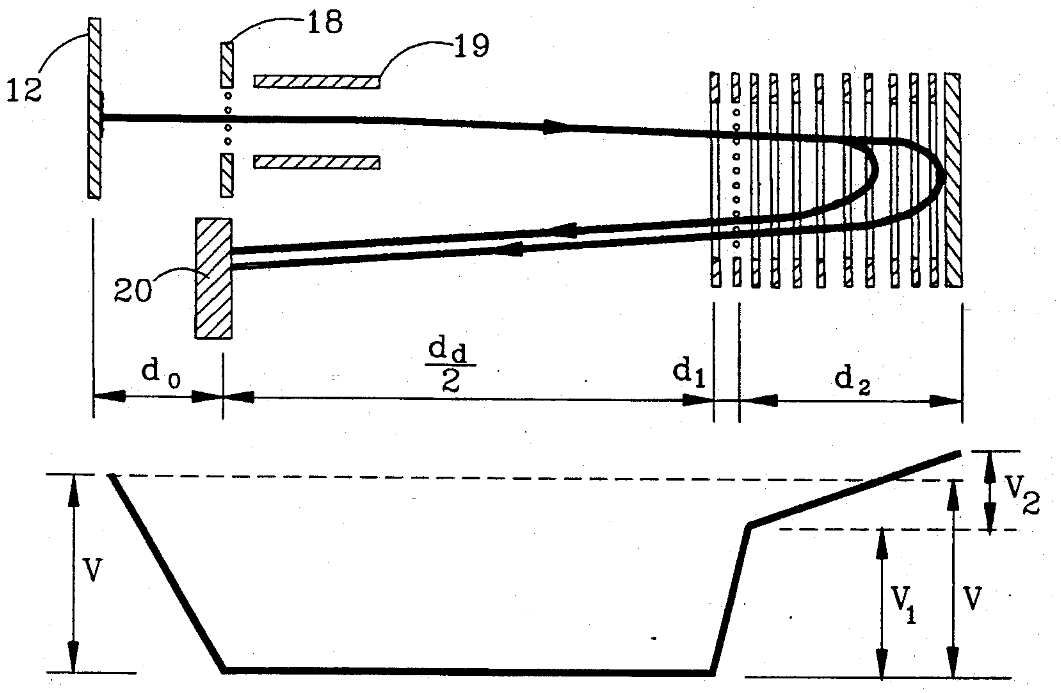
FIG. 3 PRIOR ART
FIG. 3 shows a simplified schematic diagram with potential distributions for a time-of-flight analyzer employing a two-stage reflectron according to the prior art.

A schematic diagram of time-of-flight analyzers using single-stage and two-stage mirrors according to the prior art are shown in FIGS. 2 and 3, respectively. Ions produced on plate 12 pass through plate 18 and between a pair of charged deflectors 19. In the single-stage reflectron shown in FIG. 2, the ions are reflected back to deflector 20. In a typical application, the axial length $d_1$ of the reflectron is approximately one-quarter of the drift distance $d_d$. Higher energy ions travel further into the reflectron than low energy ions, and are indicated by the lower ion flight path to the detector in FIG. 2. The corresponding potential diagram in FIG. 2 indicates that the potential $V_R$ at the terminal end of the reflectron is slightly greater than the potential V at which the ions were produced on plate 12. Using the prior art two-stage reflection as shown in FIG. 3, the axial length $d_1$ of the "correcting" field is much less than the axial length $d_2$ of the primary field. The potential $V_1$ resulting from the correcting field is typically approximately 70% of the potential V.

The present invention recognizes that the dependence on initial kinetic energy (the second term in Eq. 4) can be removed by adding an additional reflector stage to the time-of-flight analyzer. This concept is simplistically shown in FIG. 4, where this second term correction technique has been added to a single-stage mirror. The axial length $d_1$ of the primary field is much greater than the axial length $d_2$ of the correcting field. Similar improvement can be realized by adding this second term corrective stage, as shown in FIG. 5, downstream of the two-stage mirror of Mamyrin or Wollnik. In principle, very high resolution can be obtained with the resulting three-stage device. In the FIG. 5 embodiment, $d_1$ is approximately equal to $d_2$, and V equals $V_1$ plus $V_2$. The potential $V_1$ is approximately 74% of the potential V.

Figure 6:
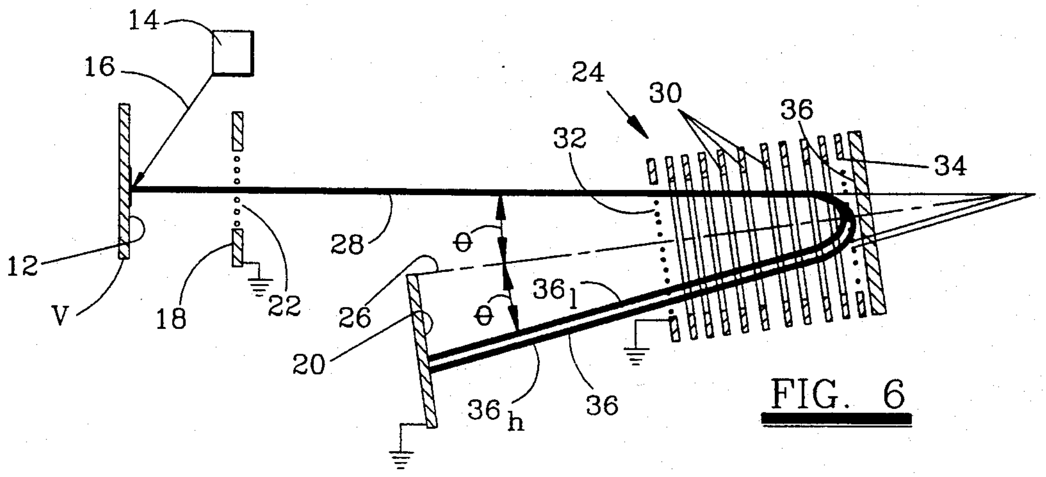
FIG. 6 is a schematic diagram of a simplified time-of-flight analyzer according to the present invention.

A schematic diagram of a time-of-flight mass spectrometer according to the present invention is shown in FIG. 6. In this embodiment, ions are produced from a small region on a flat plate 12 held at an electrical potential V as the result of a pulse of laser light 16 from source 14 incident upon the sample spot on the plate. A uniform electrical field is produced between plate 12 and a grounded plate 18 having a small aperture 22 covered by a highly transparent grid. Ions drift at constant velocity through a field-free region and enter a reflecting field 24 whose central axis 26 is inclined at a small angle, $\theta$, to the upstream direction of ion travel along axis 28. The first portion of the reflecting field 24 is essentially uniform, being formed from a stack of conducting disks 30 insulated from one another and bounded by end plates 32 and 34 with nearly transparent conducting grids. Potential, V, which is identical to the potential applied to the plate 12 from which the ions were formed, may be applied to plate 34 while plate 32 may be grounded. The potential to the disks 30 forming an approximately uniform field can be supplied by a conventional resistive divider using identical resistor values for each step. The length $d_1$ of the first stage of the reflecting field along the axis 26 is equal to the length of this first stage divided by the cos of angle $\theta$. If $\theta$ is small, these lengths will be approximately equal. A second uniform electrical field, $E_2$, is formed between the terminating plate 34 of the first electrical field and a plate 36. Ions are reflected in the reflecting field and emerge at an angle of approximately $2\theta$ from their incoming trajectory. The ions pass through a second field-free drift space and strike a flat detector 20 oriented perpendicular to the mirror axis 26. The high energy ion will travel longer in the second reflecting field, and thus paths **36*l*, and 36*h* in FIG. 2** illustrate the different high energy ion and low energy ion paths.

Figure 4:
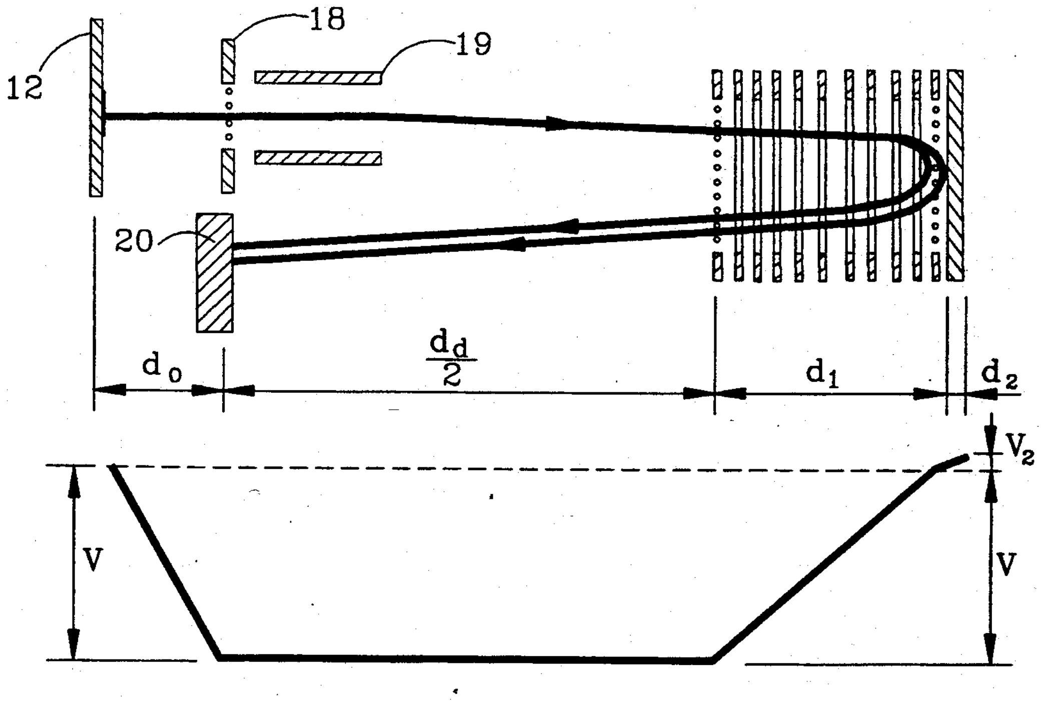
FIG. 4 shows a simplified schematic diagram with potential distributions for a time-of-flight analyzer employing a two-stage reflectron according to the present invention.
Figure 5:
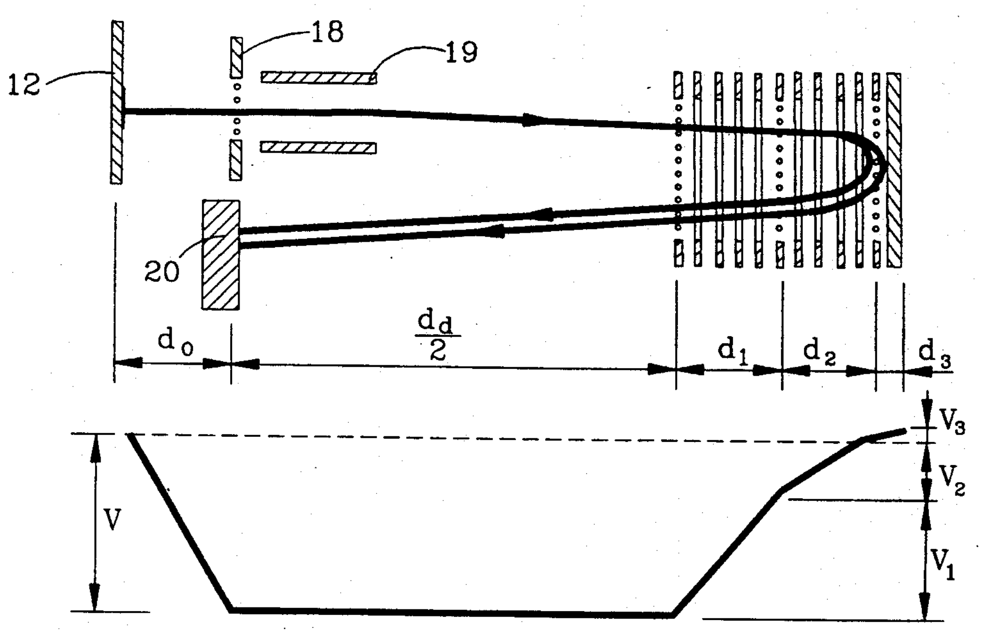
FIG. 5 shows a simplified schematic diagram with potential distributions for a time-of-flight analyzer employing a three-stage reflectron according to the present invention.

The total time that an ion spends in the first field of the reflector shown in FIGS. 4 or 6 is given by $$t_1=(2/E_1)(2m/z)^{\frac{1}{2}}[(V+V_o)^{\frac{1}{2}}-(V+V_0-V_1)^{\frac{1}{2}}] \qquad \text{Eq. 6}$$

where $E_1$, is the electrical field strength in the first stage of the reflector, and $V_1$ is the potential applied to the grid separating the first stage from the second stage.

The time spent in the second stage is given by $$t_2=(2/E_2)(2m/z)^{\frac{1}{2}}(V+V_0-V_1)^{\frac{1}{2}} \qquad \text{Eq. 7}$$

where $E_2$ is the electrical field strength in the second stage of the reflector.

It may now be appreciated that proper choice of field strengths and distance employed in the reflector can remove most of the dependence of the total flight time on the initial kinetic energy. For example, considering the simplest case of considerable practical importance which corresponds to setting $$V_1=V \qquad \text{Eq. 8}$$

then by collecting similar terms the total ion flight time through an analyzer depicted in FIGS. 4 or 6 can be expressed by $$t = (2m/zV)^{\frac{1}{2}}[(1 + V_o/V)^{\frac{1}{2}}(d_o + 2V/E_1) + (d_d/2)(1 + V_o/V)^{-\frac{1}{2}} + V_o^{\frac{1}{2}}(2V/E_2 - 2V/E_1 - d_o)] \qquad \text{Eq. 9}$$

The conditions for minimizing the dependence of the flight time on the initial kinetic energy $V_0$ are as follows:

$$2V/E_2-2V/E_1-d_0=0 \qquad \text{Eq. 10}$$

and $$d_0+2V/E_1=d_d/2 \qquad \text{Eq. 11}$$

The latter conditions are satisfied by setting the length of the first section of the mirror to $$d_1=(d_d-2d_0)/4 \qquad \text{Eq. 12}$$

The former condition then requires that $$E_2=4V/d_d \qquad \text{Eq. 13}$$

which can be satisfied by applying an appropriate potential to the end of the mirror. The length of the second stage must be chosen sufficiently long that the ions with the highest energy of interest are reflected. This requires that $$E_2d_2>V_0 \text{ or } d_2>4d_dV_0(\max)/V \qquad \text{Eq. 14}$$

where $V_0(\max)$ is the maximum initial kinetic energy.

With these conditions satisfied, the total ion flight time (neglecting higher order terms in $V_0/V$) is given by $$t=d_d(2m/z)^{\frac{1}{2}}[1+(\tfrac{1}{8})(V_0/V)^2] \qquad \text{Eq. 15}$$

and $$dt/t=(\tfrac{1}{8})(V_0/V)^2 \qquad \text{Eq. 16}$$

and the mass resolving power is given by Eq. 5. This corresponds to a very small dependence on the initial kinetic energy. For example, if the initial kinetic energy $V_0$ were 1% of the total accelerating potential V, then according to Eq. 16 the flight time of such an ion would differ by only 1.25 parts in 100,000 from that for an ion with zero kinetic energy. On the other hand, in the uncorrected analyzer described by Eqs. 1–4, and shown in FIG. 1, the difference in flight times would be comparable to the relative energy difference or about 0.5%.

Prior art time-of-flight systems have been built using a reflector with a single uniform field to correct for the variation in flight time through the field-free region due to the energy spread, but these systems do not correct for the variation in flight time through the accelerating region. For the simple linear reflector, the focusing condition is $$d_1=d_d/4 \qquad \text{Eq. 17}$$

with $$E_1=V/d_1=4V/d_d \qquad \text{Eq. 18}$$

In this case the nominal total flight time is the same as with the new two-stage reflectors as given in Eq. 15 above, but the source (the second term in Eq. 2) is not removed. Thus the relative time dispersion in this case is given by $$dt/t=(\tfrac{1}{8})(V_0/V)^2-(d_0/d_d)(V_0/V)^{\frac{1}{2}} \qquad \text{Eq. 19}$$

While the use of a two-stage mirror for correcting for energy spread in a time-of-flight analyzer has been described by Mamyrin and co-workers, this device differed in several important respects from the present invention. The purpose of the Mamyrin design was to correct to second order for variations in the time through the field-free drift space, and no consideration was given to time differences introduced in accelerating fields such as in the source region. The embodiment of the present invention using a two-stage mirror as described above corrects, to first order, variations in flight time through the drift tube and exactly corrects for variations in flight time through the accelerating fields. An embodiment providing second order correction for variations in flight time through the drift tube can be made by adding a third stage which corrects for the source term.

An idealized three-stage mirror is shown schematically in FIG. 5. The time that an ion spends in each of the stages of the mirror is given by the following:

$$t_1=(2/E_1)(2m/z)^{\frac{1}{2}}[(V+V_0)^{\frac{1}{2}}-(V+V_0-V_1)^{\frac{1}{2}}] \quad \text{Eq. 20}$$

$$t_2=(2/E_2)(2m/z)^{\frac{1}{2}}[(V+V_0-V_1)^{\frac{1}{2}}-V_0^{\frac{1}{2}}] \quad \text{Eq. 21}$$

$$t_3=(2/E_3)(2m/z)^{\frac{1}{2}}V_0^{\frac{1}{2}} \quad \text{Eq. 22}$$

where $E_1=V_1/d_1$, $E_2=V_2/d_2$, $E_3=V_3/d_3$, $V_1+V_2=V$, and V is the total ion accelerating voltage. The times spent in the ion accelerating field and the drift region are given in the earlier discussion, for example, by Eqs. 1 and 2.

These equations can be simplified in appearance by making the following substitutions.

Let $V_1/V=v_1$, $V_2/V=v_2$, $V_3/V=v_3$, $k=(2m/zV)^{\frac{1}{2}}$, $x=V_0/V$, and $d_d=d$.

Then the equations for ion flight time through the various regions can be written as follows:

$$t_0=d_0k[(1+x)^{\frac{1}{2}}-x^{\frac{1}{2}}] \quad \text{Eq. 23}$$

$$t_d=(d/2)k(1+x)^{-\frac{1}{2}} \quad \text{Eq. 24}$$

$$t_1=(2d_1k/v_1)[1+x)^{\frac{1}{2}}-(1+x-v_1)^{\frac{1}{2}}] \quad \text{Eq. 25}$$

$$t_2=(2d_2k/v_2)[1+x-v_1)^{\frac{1}{2}}-x^{\frac{1}{2}}] \quad \text{Eq. 26}$$

$$t_3=(2d_3k/v_3)x^{\frac{1}{2}} \quad \text{Eq. 27}$$

If we expand the total flight time as a power series in x, we have $$t/k=c_0+c_{\frac{1}{2}}x^{\frac{1}{2}}+c_1x+c^2+c_3x^3+ \quad \text{Eq. 28}$$

where $$t=t_0+t_d+t_1+t_2+t_3 \quad \text{Eq. 29}$$

and using the Taylor series expansions $$(1+x)^{\frac{1}{2}}=1+x/2-x^2/8+x^3/16+ \quad \text{Eq. 30}$$

$$(1+x)^{-\frac{1}{2}}=1-x/2+3x^2/8-5x^3/16+ \quad \text{Eq. 31}$$

$$(1+x-v_1)^{\frac{1}{2}}=(1-y_1)^{\frac{1}{2}}+(x/2)(1-v_1)^{-\frac{1}{2}}-(x^2/8)(1-v_1)^{-3/2}+(x^3/16)(1-v_1)^{-5/2}+ \quad \text{Eq. 32}$$

then the coefficients of the power series are given by $$c_0=d_0+d/2+2d_1/v_1+(1-v_1)^{\frac{1}{2}}(2d_2/v_2-2d_1/v_1) \quad \text{Eq. 33}$$

$$c_{\frac{1}{2}}=2d_3/v_3-2d_2/v_2-d_0 \quad \text{Eq. 34}$$

$$c_1=(\tfrac{1}{2})[d_0-d/2+2d_1/v_1+(1-v_1)^{-\frac{1}{2}}(2d_2/v_2-2d_1/v_1)] \quad \text{Eq. 35}$$

$$c_2=(\tfrac{1}{8})[-d_0+3d/2-2d_1/v_1-(1-v_1)^{-3/2}(2d_2/v_2-2d_1/v_1)] \quad \text{Eq. 36}$$

$$c_3=(1/16)[d_0-5d/2+2d_1/v_1+(1-v_1)^{-5/2}(2d_2/v_2-2d_1/v_1)] \quad \text{Eq. 37}$$

The conditions for minimizing the dependence of the flight time on the initial kinetic energy $V_0$ are $$c_{\frac{1}{2}}=c_1=c_2=0 \quad \text{Eq. 38}$$

and the coefficient $c_3$ should be minimized.

The simultaneous solutions to these three equations are the following:

$$d_1=d[(\tfrac{3}{4}-d_0/2d)v_1-\tfrac{1}{2}] \quad \text{Eq. 39}$$

$$d_2=d(v_2/v_1)[d_1/d+(\tfrac{1}{2})(1-v_1)^{3/2}] \quad \text{Eq. 40}$$

$$d_3=v_3(d_0/2+d_2/v_2) \quad \text{Eq. 41}$$

The coefficient $c_0$ is proportional to the total ion flight time, for $V_0=0$, and under the conditions given by Eqs. 39–41 is given by $$c_0=v_1d \quad \text{Eq. 42}$$

The lowest order remaining dependence on $V_0$ is given by $$c_3=-(d/16)[1-(v_1v_2)^{-1}] \quad \text{Eq. 43}$$

and the relative variation in flight time is given by $$dt/t=(c_3/C_0)(V_0/V)^3 \quad \text{Eq. 44}$$

As can be seen from Eq. 39, there is a minimum value of $v_1$ which can be used practically since $d_1$ approaches zero as that value is approached. This value of $v_1$ corresponds to the minimum value for $c_3$, but significantly larger values can be used with at most a very small effect on the resolution.

Figure 9:
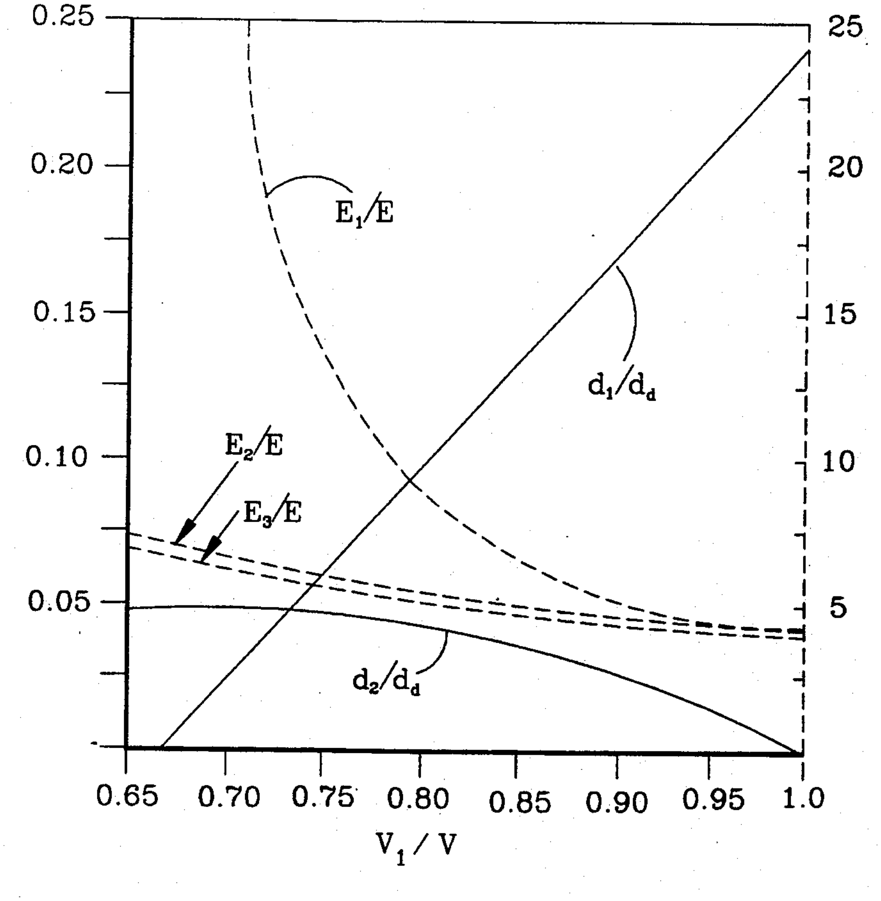
FIG. 9 is a plot of calculation of focusing conditions for a three-stage reflectron according to the present invention. Voltage ratios are given on the abscissa. Plotted distance ratios correspond to the left ordinate, and plotted field ratios correspond to the right ordinate.

Calculations based on these equations for a typical case are summarized in FIG. 9. For this case $d_0/d=0.01$ and results are given over the range from the value of $V_1$ corresponding to $d_1=0$ to the maximum value which corresponds to the two-stage reflector described above. The theoretical resolution is maximized as $d_1$ approaches zero, however, this is impractical since the field strength in this case approaches infinity. It should be noted that the third order coefficient $c_3$ changes slowing with $v_1$ up to at least $v_1=0.8$, and the difference in field strength between region 1 and 2 decreases. A practically useful system corresponds to the case in which $d_1=d_2$. In this case, the coefficient $c_3$ is less than 10% larger than its minimum value, and the field $E_1$ is less than three times larger than the field $E_2$. This allows a practical system to be constructed without uncontrolled perturbations associated with boundaries between regions of highly differing field strengths. Furthermore, this system can be readily adjusted to achieve high resolution. By choosing nominal values of $d_1=d_2$, $d_3$, and d, and by adjusting the potentials $V_1$, $V_3$, and the distance d, the analyzer can be fine tuned to achieve high resolution. This combination gives a very high theoretical resolving power for an idealized analyzer, although in practical terms it may be difficult to attain such high resolution because of imperfections in the mirror and because aberrations due to the finite size angular divergence of the ion beam generally will provide the limits on the actual resolution that can be achieved.

Figure 7:
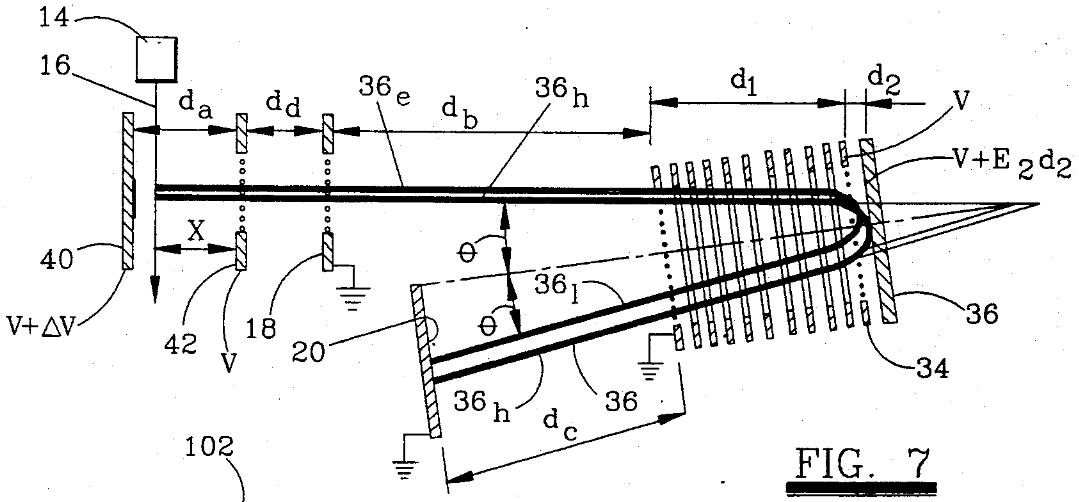
FIG. 7 is an alternate embodiment of the mass analyzer shown in FIG. 6 for a gas phase ionization.

Another case of interest, illustrated schematically in FIG. 7, corresponds to ions being formed in the gas phase as the result of ionization of neutral molecules by electron impact or photoionization. In this case, the ions may be formed throughout a region of space corresponding to the path of the ionizing radiation. Alternatively the ions could be introduced into this region as an ion beam from an external ionization source, such as an electrospray system. After ions are formed in this region, a pulsed voltage ΔV is applied between the plates 40 and 42 bounding the source region to accelerate the ions toward the detector. If a pulsed source of ionizing radiation which is unaffected by this accelerating field is used, such as a laser beam, then it is not necessary to pulse the accelerating field and it can be applied continuously.

The time required for an ion to traverse the source region and reach the first grid plate 18 defining the primary accelerating field is given by $$t_x=(d_a/\Delta V)(2m/z)^{\frac{1}{2}}[(V_x+V_o)^{\frac{1}{2}}-V_o^{\frac{1}{2}}] \quad \text{Eq. 45}$$

where $V_o$ is the initial kinetic energy of the ion in the direction of travel and $$V_x=x\Delta V/d_a \quad \text{Eq. 46}$$

The time to traverse the main accelerating field is given by $$t_o=d_o/V(2m/z)^{\frac{1}{2}}[(V+V_x+V_o)^{\frac{1}{2}}-(V_x+V_o)^{\frac{1}{2}}] \quad \text{Eq. 47}$$

The time to traverse the drift space is given by $$t_d=(d_d/2)(2m/z)^{\frac{1}{2}}(V+V_x+V_o)^{-\frac{1}{2}} \quad \text{Eq. 48}$$

The time spent in the first field of the reflector is given by $$t_1=(2/E_1)(2m/z)^{\frac{1}{2}}[(V+V_x+V_o)^{\frac{1}{2}}-(V_x+V_0)^{\frac{1}{2}}] \quad \text{Eq. 49}$$

The time spent in the second field of the reflector is given by $$t_2=(2/E_2)(2m/z)^{\frac{1}{2}}(V_x+V_o)^{\frac{1}{2}}$$

And the focusing conditions are $$d_1=(d_d-2d_0)/4 \quad \text{Eq. 51}$$

which is identical with Eq. 12, and $$2/E_2-2/E_1-d_0/V+d_a/\Delta V=0 \quad \text{Eq. 52}$$

which combined with Eq. 51 can be arranged to give $$E_2=4V/(d_d-2d_aV/\Delta V) \quad \text{Eq. 53}$$

Under these conditions, the flight time is nearly independent of the position of initial ion formation, and the relative spread in ion flight time is given by $$dt/t=(\tfrac{1}{8})(\Delta V/V)^2(\Delta x/d_a)^2-(V_0V/\Delta V^2)^{\frac{1}{2}}(d_a/d_d) \quad \text{Eq. 54}$$

where ΔX is the width of the region in which ions are produced. Since Eq. 51 is identical to Eq. 12, the same analyzer geometry is optimum for both applications and it is only necessary to adjust the electrical fields to obtain optimum performance. Similarly, the gas phase ion source can also be used with the three-stage reflector to provide second order correction, and it is only necessary to adjust the electrical fields to obtain optimum performance.

While it is possible to build a time-of-flight analyzer as described above, it has some practical limitation. First, it uses uniform electrical fields, so no ion focusing is provided and ion transmission may be rather low. Second, it does not provide a means of removing low energy ions resulting from ion-molecule collisions or unimolecular dissociation of the ions in flight. A more practical analyzer is shown schematically in FIG. 8, where several elements have been added to the system. These include a filter lens 49 in front of the detector 52 to remove low energy ions, beam guides 54 and 56 in drift spaces, an adjustable potential source 58 for the ion accelerator to focus the ions, and a small accelerating field formed by voltage source 60 between the end of the drift space and the electron multiplier 52. The effect of adding the filter lens 49 can be compensated approximately by replacing $d_o$ in the above equations by $d_0+d_f$, where $d_f$ is the length of the filter lens. The effect of the nonuniform fields and the potential applied to the central wires 55 and 57 of the beam guides 54, 56 is that the optimum energy focusing condition expressed in Eqs. 12 and 51 is not exactly satisfied by the actual geometric distances. What this condition really requires for the case of the simple two-stage reflector is that the total time that an ion formed with zero initial kinetic energy spends in accelerating and decelerating fields, including the field in the first stage of the mirror, be equal to the total time that the ion takes to traverse the field-free drift space, and it must be reflected at the boundary between fields $E_1$ and $E_2$. The field $E_2$, given approximately by Eqs. 13 and 53, is then adjusted so that ions with excess kinetic energy take an extra amount of time in this region which properly compensates for the shorter time that they spend in the drift space and other accelerating fields. Best performance may be accomplished by making the distance from the source and/or the electron multiplier to the entrance to the reflector adjustable from outside the vacuum system. In this way, both conditions can be simultaneously satisfied by empirically adjusting the drift distance and the field $E_2$ until the best resolution is obtained. In this way a practical analyzer with high transmission and high resolution can be constructed.

Figure 10:
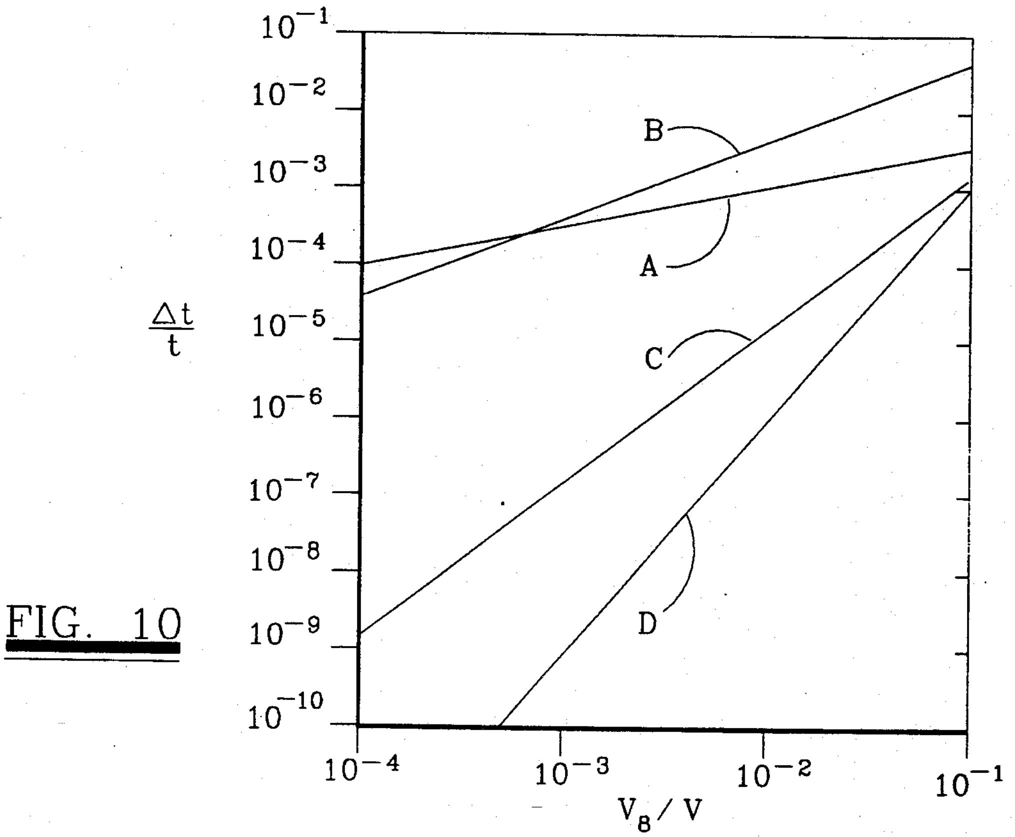
FIG. 10 is a plot of time dispersions and theoretical mass resolutions as a function of relative initial kinetic energy for (A) a source energy term only, (B) a linear analyzer, (C) a two-stage reflector according to the present invention, and (D) a three-stage reflector according to the present invention.

Calculated results for the time dispersions and corresponding theoretical mass resultions as functions of relative initial kinetic energy ($V_0/V$) for each of the analyzer geometries discussed above are summarized in FIGS. 10 and 11. The plots in FIG. 10 include the time dispersion contribution for (A) the source energy term only, (B) the linear analyzer, (C) the two-stage mirror according to the present invention, and (D) the three-stage mirror according to the present invention. The time dispersions for the single-stage mirror and two-stage mirror according to the prior art are given by (A+C) and (A+D), respectively. These calculations correspond to the case where $$d_d(\mathit{eff})/d_0=200 \quad \text{Eq. 55}$$

and $d_d$(eff) is equal to $d_d$ for the reflectron analyzers and to $2d_d$ for the linear analyzer so that the nominal total flight times are the same. Further, increasing this ratio reduces the effect of the source energy term on the time dispersion in proportion, but it appears to be impractical to increase this factor by much, and many practical analyzers, such as the one illustrated in FIG. 8, require smaller values of this ratio.

Figure 11:
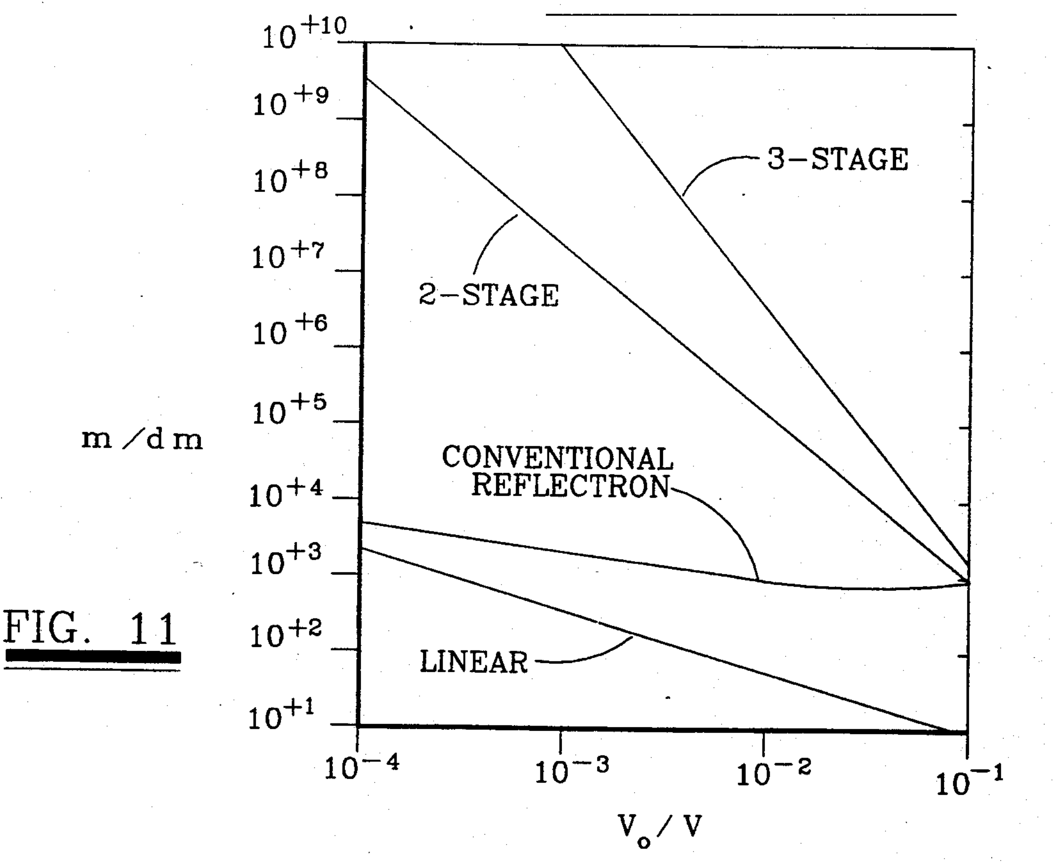
FIG. 11 is a graph depicting calculated resolving powers for various analyzers, and illustrates the superior performance of time-of-flight analyzer according to the present invention.

The calculated resolving powers for each of these analyzer geometries are plotted as a function of $V_0/V$ in FIG. 11 where the advantages of the present invention are clearly demonstrated. The theoretical performance of three-stage reflector is vastly superior to the performance of any time-of-flight analyzer presently available, and if this potential can be approached in a practical device, then a truly high resolution time-of-flight analyzer will be possible.

Figure 8:
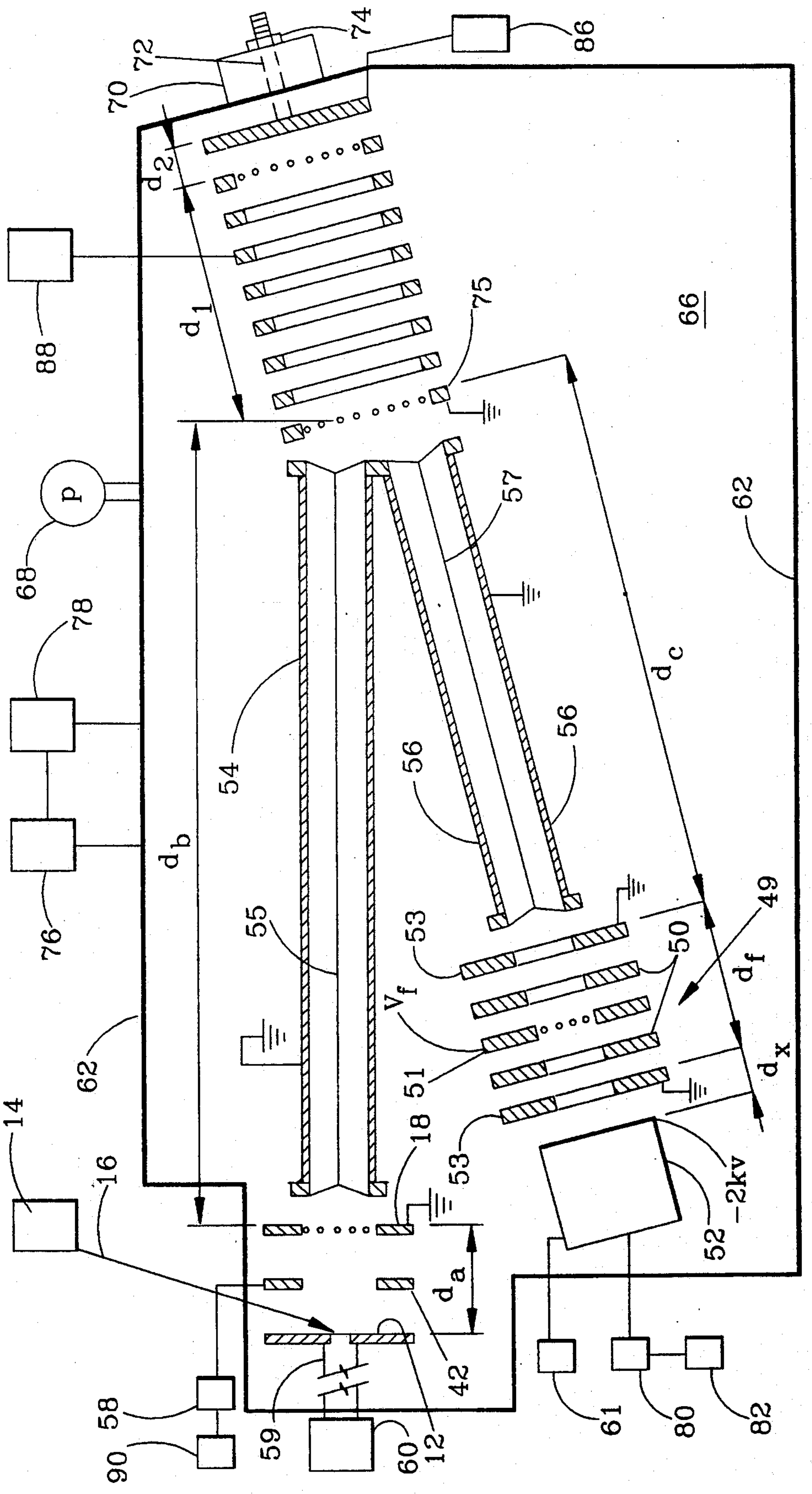
FIG. 8 is a more detailed schematic diagram of a mass analyzer according to the present invention.

Those skilled in the art will understand that the concepts of the present invention are applicable to various types of time-of-flight mass spectrometers. As previously indicated, the improved reflectron may be used with various techniques for forming ions, including matrix-assisted laser desorption or electron ionization in gas phase. While the structure of the overall spectrometer will depend in part upon the technique used to form ions and the requirements of the analytical techniques to which the analyzer will be employed, the primary components of a suitable spectrometer not previously discussed are shown in FIG. 8. A conventional ionization device 60 may include a probe 59 with a sample placed at the end thereof. Housing 62 provides a window to allow the laser beam 16 to pass therethrough and reach the sample, and creates a sealed vacuum chamber for the sample plate 12, plate 42, and plate 18. The conventional spectrometer housing 62 is schematically shown in FIG. 8 with sealed chamber 66 therein for receiving the components previously discussed. One or more conventional vacuum pumps 68 may be used to maintain the desired vacuum within the chamber 66.

FIG. 8 depicts schematically an adjustable voltage source 58 for selectively controlling the electrical potential applied to plate 42 to focus the ions. High voltage power supply 76 is provided external the housing 62 for applying a desired voltage to the highly charged components, and one or more adjustable controllers 78 may be provided for varying the potential to specific plates. A second ion reflecting field region $d_2$ may be varied by adjusting the central controller 86. A conventional controller 88 comprises substantial uniform electrical potential between each of the plurality of plates in the first ion reflecting region $d_1$. Suitable electrical leads and ports through the housing 62 for passing the high electrical potentials and electrical insulators for spacing the plates are not depicted for simplification.

With respect to the ion source 60, ions may be formed in gas phase as a result of ionization of neutral molecules by electron impact, by photoionization, or by electrospray. The gas phase embodiment is discussed below and generally shown in FIG. 12. In either of these cases, controller 90 may be provided for briefly charging the plates 12 and/or 42 to generate a pulse of accelerated ions. The laser 14 may be pulsed in a conventional manner to generated pulses of ions, which are then accelerated within the ion accelerating regions. With respect to the detector, electronics 80 may be provided for amplifying ion detection signals from detector 52, and ion detection signals recorded as a function of time by recorder 82.

An end assembly 70 is provided opposite the reflectron with respect to the ion source, and includes conventional ports for receiving electrical leads (not shown) to maintain the plates at the desired potential. It is a feature of the present invention that the position of the reflectron can be easily adjusted from outside the spectrometer housing 64. As shown in FIG. 4, one embodiment of this concept may include a threaded rod 72 and a seal assembly 74, with the threaded rod electrically insulated from but mechanically connected by any suitable means to the assembly of plates 30, so that the spacing between the source and the reflectron, as well as the spacing between the reflectron and the detector, may be easily adjusted. According to the simplified embodiment shown, the position of the reflectron within the housing 66 may be easily adjusted from outside the spectrometer housing by rotating the threaded rod 72 while maintaining the chamber 66 sealed.

The embodiment illustrated in FIG. 8 also includes a filter lens 49 consisting of electrically charged plates 50 and 51 and grounded plates 53. The central element 51 of this filter lens is connected to the same electrical potential as ion source plate 12 and prevents ions which have lost kinetic energy as the result of dissociation or collision from reaching the detector. Application of an adjustable potential to plates 50 assists in focusing ions through the energy filter. Conventional beam guides consisting of grounded outer tubes 54 and 56 and charged inner wires 55 and 57 are included in the drift space of the embodiment shown in FIG. 8. Application of a small electrical potential of opposite sign to the charge on the ions of interest to the central wire focuses the ions and increases the efficiency of ion transport from the source to the detector. Inclusion of focusing elements such as the beam guides 55 and 57 and focusing electrodes 50 and 42 makes precise calculation of the proper reflector potentials and drift distance for minimum time dispersion rather difficult, but by empirical adjustment of the drift distance and the potentials on the reflectors and focusing elements, it is possible with the embodiment shown in FIG. 8 to simultaneously achieve efficient ion transmission and high mass resolution.

Figure 12:
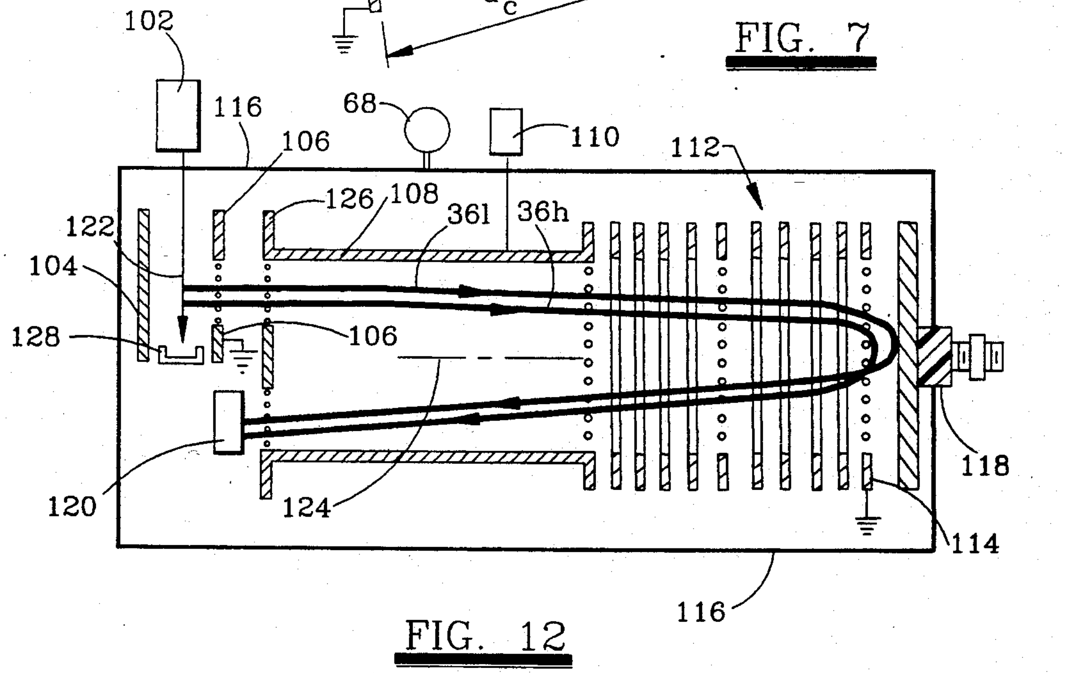
FIG. 12 is a schematic diagram of a mass analyzer with a three-stage reflector according to the present invention.

An alternative embodiment suitable for use with a variety of ionization sources is illustrated in FIG. 12. This embodiment employs an external, differentially pumped ion source 102 similar to that used in quadrupole mass spectrometers, and may be of a variety of types including electron impact, chemical ionization, thermospray, or electrospray. In this embodiment the ion source region defined by plates 104 and 106 is at ground potential, and the ion drift tube 108 is charged to an elevated potential by power supply 110. The embodiment shown employs a three-stage reflector 112 according to the present invention, with the end plate 114 defining the boundary between the second and third stages at ground potential. The distance between the reflector and the ion source and detector is variable from outside the vacuum housing 116 using a conventional threaded rod and seal assembly 118, as previously discussed. Ions are detected by a conventional electron multiplier 120. Ions are generated continuously by the external ion source 102 which produces a nearly parallel beam 122 of low energy ions moving transverse to the axis 124 of the reflector 112. Periodically, a pulse is applied to plate 104 to accelerate a pulse of ions out of the source, and these ions are further accelerated by the potential difference between plate 126 which is at the drift tube potential and the grounded plate 106. Any ions which transverse the ion source between pulses are collected on electrode 128.

Those skilled in the art will understand that this invention has been disclosed in a manner which will enable one to fully appreciate its features and advantages of the invention, although the description with respect to specific components and the accuracy with respect to the spacing, sizing, and number of components is not considered critical to this understanding. By way of example, only a few representative plates 30 for the reflectron are shown in the figures, although those skilled in the art will understand that this reflectron typically may include twenty or more plates. Many of the individual components of the spectrometer are conventional in the industry, and thus are only schematically depicted.

The foregoing disclosure and description of the invention are thus illustrative and explanatory, and various changes in the size, shape and materials, as well as the details of this construction, may be made within the scope of the claims without departing from the spirit of the invention. Alternative embodiments and operating techniques will become apparent to those skilled in the art in view of this disclosure, and such modifications should be considered within the scope of the invention, which is defined by the following claims.

What is claimed is:

1. A time-of-flight mass spectrometer, comprising:

a sealed housing;

a vacuum pump for maintaining a vacuum within the sealed housing;

an ion source within the sealed housing for producing ions;

one or more electrically-charged accelerating plates within the sealed housing for accelerating pulses of produced ions through one or more accelerating fields;

a first ion drift region for passing accelerated ions;

an ion reflection device within the sealed housing for reflecting ions downstream from the first ion drift region;

a second ion drift region within the sealed housing for passing reflected ions;

the ion reflecting device including (a) one or more electrically charged plates for establishing a first reflecting field to reflect ions of a relatively low energy level, (b) one or more second electrically charged plates for establishing a second reflecting field to reflect ions of a relatively high energy level, and (c) means for adjusting the second reflecting field independent of the first reflecting field for establishing a substantially uniform flight time through a combination of the one or more accelerating fields, the first and second drift regions, and the reflecting fields; and an ion detector within the sealed housing downstream from the second ion drift region for detecting ions as a function of time.

2. The time-of-flight mass spectrometer as defined in claim 1, further comprising:

means external of the housing for adjusting the spacing between the ion reflection device and at least one of the ion source and ion detector.

3. The time-of-flight mass spectrometer as defined in claim 1, further comprising:

a first beam guide for substantially increasing ion transmission efficiency within the first drift region; and a second beam guide for substantially increasing ion transmission efficiency within the second drift region.

4. The time-of-flight mass spectrometer as defined in claim 1, further comprising:

means for selectively activating one or more of the accelerating fields to generate pulses of ions through the first ion drift region.

5. The time-of-flight mass spectrometer as defined in claim 1, further comprising:

one or more high voltage power supplies for supplying a desired electrical potential to each of the accelerating plates and reflecting plates; and means for applying a substantially uniform electrical potential between adjacent spaced reflecting plates in the first plurality of reflecting plates.

6. The time-of-flight mass spectrometer as defined in claim 1, wherein the ion detector comprises:

means for detecting ions and generating an ion detection signal in response thereto;

electronics for amplifying detected ion signals; and means for recording the ion detection signals as a function of time.

7. The time-of-flight mass spectrometer as defined in claim 1, further comprising:

one or more downstream accelerating plates spaced between the second drift region and the ion detector for establishing a downstream accelerating field.

8. A time-of-flight mass spectrometer as defined in claim 1, further comprising:

means for adjusting the electrical potential to the one or more ion accelerating plates to focus the ions.

9. The time-of-flight mass spectrometer as defined in claim 1, further comprising:

a filter lens positioned in one of the first and second drift regions for removing low energy ions.

10. A time-of-flight mass spectrometer, comprising:

a sealed housing;

a vacuum pump for maintaining a vacuum within the sealed housing;

an ion source within the sealed housing for producing ions;

one or more electrically-charged accelerating plates within the sealed housing for accelerating pulses of produced ions through one or more accelerating fields;

a first ion drift region for passing accelerated ions;

an ion reflection device within the sealed housing for passing reflected ions;

a second ion drift region within the sealed housing for passing reflected ions;

the ion reflection device including (a) one or more first electrically charged plates for establishing a first field, (b) one or more second electrically charged plates for establishing a second field downstream from the first field, (c) one or more third electrically charged plates for establishing a third field downstream from the second field, (d) means for adjusting the first and second fields for establishing a substantially uniform flight time for low energy ions through a combination of the first and second drift regions, and (e) means for adjusting the third field independent of the first and second fields for establishing a substantially uniform flight time for high energy ions through the combination of the first and second drift regions, the one or more accelerating fields, and the ion reflection device; and an ion detector within the sealed housing downstream from the second ion drift region for detecting ions as a function of time.

11. The time-of-flight mass spectrometer as defined in claim 10, wherein the axially length of the first field is approximately the axial length of the second field.

12. The time-of-flight mass spectrometer as defined in claim 10, further comprising:

means external of the housing for adjusting the spacing of the ion reflection device and at least one of the ion source in ion detector.

13. A method of operating a time-of-flight mass spectrometer including a sealed housing, a vacuum pump for obtaining a vacuum within the sealed housing, an ion source for generating ions, one or more electrically charged accelerating plates for accelerating produced ions through one or more ion accelerating fields, a first ion drift region for passing accelerated ions, an ion reflection device for reflecting ions downstream of the first ion drift region, a second ion drift region for passing reflected ions, and an ion detector downstream of the second ion drift region, the method comprising:

establishing a first reflecting field within the ion reflection device for reflecting ions of a relatively low energy;

establishing a second reflecting field downstream from the first reflecting field for reflecting ions of a relatively high energy; and adjusting the strength of the second reflecting field independent of the first reflecting field for obtaining a substantially uniform ion flight time through a combination of the one or more accelerating fields, the first and second drift regions, and the first and second reflecting fields.

14. The method as defined in claim 13, further comprising:

adjusting the spacing between the reflection device and at least one of the ion source and ion detector such that the ion travel time to traverse the first and second drift regions substantially equals the ion travel time through the one or more accelerating fields and the first and second reflecting fields.

15. The method as defined in claim 13, wherein the step of adjusting the strength of the second reflecting field includes increasing the time high energy ions spend in the second reflecting field compared to relatively low energy ions by an amount substantially equal to the shortened time the relatively high energy ions spend in the one or more accelerating fields and the first and second ion drift regions compared to the relatively low energy ions.

16. The method as defined in claim 13, wherein the second reflecting field is adjusted as an inverse function of the ion travel length within the first and second drift regions, and is adjusted as a direct function of the electrical potential applied to one or more of the accelerating fields.

17. The method as defined in claim 13, further comprising:

establishing a correcting field between the first drift region and the first reflecting field for substantially minimizing ion flight time variations through the first and second ion drift regions.

18. The method as defined in claim 13, wherein the ion source forms ions in gas phase as a result of ionization of neutral molecules by a technique involving at least one of electron impact, photoionization, and electrospray.

19. The method as defined in claim 13, wherein:

the ion source produces an ion beam; and selectively activating at least one of the ion accelerating fields for producing pulses of ions from the ion beam.

20. The method as defined in claim 13, further comprising:

electrically grounding an entrance to the ion reflection device;

applying an electrical potential at an end plate between the first and second reflecting fields at substantially the same electrical potential that ions are produced in the ion source.

* * * * *